United States Patent [19]

Walkenhorst et al.

[11] 4,275,177
[45] Jun. 23, 1981

[54] PROCESS FOR CONTINUOUS MASS POLYMERIZATION OF ALKENYL-AROMATIC COMPOUNDS

[75] Inventors: Wilfried Walkenhorst, Königstein; Richard Gauer, Wiesbaden; Gerhard Wild, Frankfurt am Main; Walter Müller, Kelkheim, all of Fed. Rep. of Germany

[73] Assignee: Hoechst Aktiengesellschaft, Frankfurt am Main, Fed. Rep. of Germany

[21] Appl. No.: 73,654

[22] Filed: Sep. 10, 1979

[30] Foreign Application Priority Data

Sep. 12, 1978 [DE] Fed. Rep. of Germany ....... 2839563

[51] Int. Cl.³ .......................... C08F 2/02; C08F 12/08
[52] U.S. Cl. .................................. 525/53; 260/4 AR; 525/316; 526/65; 526/88; 422/138

[58] Field of Search .......................... 422/138; 525/53; 526/65, 88; 260/4 AR

[56] References Cited

U.S. PATENT DOCUMENTS

| | | | |
|---|---|---|---|
| 3,451,986 | 6/1969 | Metais | 526/88 |
| 3,903,202 | 9/1975 | Carter et al. | 525/316 |
| 4,107,410 | 8/1978 | Tocker | 526/88 |

FOREIGN PATENT DOCUMENTS 411884 5/1974 U.S.S.R. ................................... 422/138

Primary Examiner—Edward J. Smith
Attorney, Agent, or Firm—Curtis, Morris & Safford

[57] ABSTRACT

Styrene-containing polymers are produced by one- or multi-stage prepolymerization and subsequent continuous, one- or multi-stage main polymerization with final working up. In the main polymerization stage(s) the mixture is subjected simultaneously to a heat exchange and a static mixing procedure.

5 Claims, 2 Drawing Figures

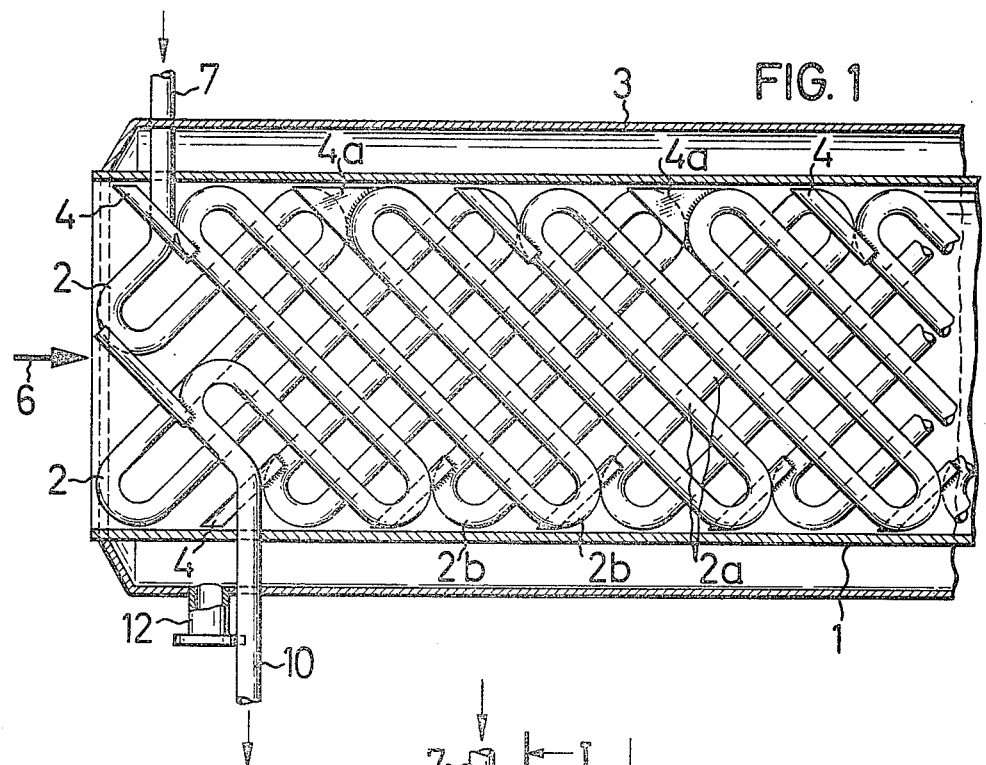
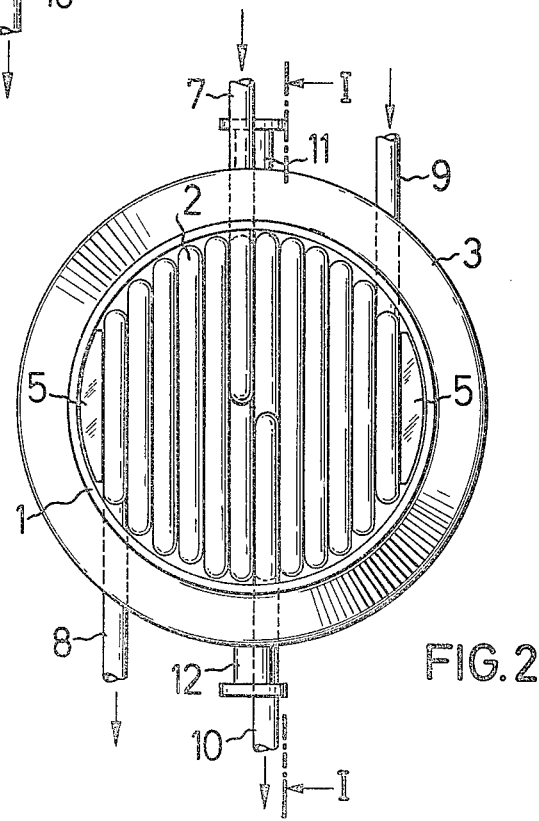

PROCESS FOR CONTINUOUS MASS POLYMERIZATION OF ALKENYL-AROMATIC COMPOUNDS

Styrene polymers are presently used in many fields of application in the form of transparent polystyrene, as copolymer with acrylonitrile (SAN) and as impact-resistant polymers (impact-resistant polystyrene, ABS) containing a natural or synthetic rubber as component imparting impact resistance.

In conformity with the importance of the aforesaid materials a great number of processes have been developed for their manufacture. For economical reasons they are preferably produced by continuous mass processes, optionally with the addition of up to 20% of an inert diluent. The reaction is initiated thermally or by adding free radical donating agents.

The polymerization is optionally carried out in the presence of plasticizers, regulators, antioxidants and other additives.

For the utilitarian properties of all plastic materials containing polystyrene it is essential that the molecular weight average is in the range of from $150 \cdot 10^3$ to $350 \cdot 10^3$ and that the proportion of material having a low molecular weight below $100 \cdot 10^3$ is as low as possible.

It is known that the reaction temperature is an essential determining factor for the molecular weight and molecular weight distribution. The polymerization of styrene is exothermal with a reaction heat of 175 kcal/kg. A completely adiabatic reaction would result in a strong self-heating of the mass by about 4° C. for each percent of styrene conversion. Every expert knows this phenomenon as a getting-out of control of the reaction which leads to an increased formation of low molecular weight fractions. Besides a broad molecular weight distribution, products resulting from such a process have poor mechanical properties.

In order to maintain the optimum polymerization temperature in each case it is, therefore, necessary to remove the major part of the reaction heat from the polymerizing mixture.

The fact that with prolonged duration of polymerization the viscosities strongly increase naturally renders difficult the dissipation of heat over the walls of the reactor. It, therefore, is the state of the art to carry out the polymerization in the low viscous range in vessels provided with stirring means and with intense stirring, while additionally utilizing the heat of evaporation of the boiling monomer for cooling of the polymerizing mixture.

In the manufacture of transparent homopolystyrene, the viscosities permit a reaction in a stirred vessel up to a polymer content of about 70%. In the manufacture of impact resistant polystyrene, however, the polymerizing mixture having a polymer content of from 30 to 50% has to be transferred from the intensely stirred vessel into a tube reactor with gentle agitation, as otherwise the content of soft phase in the products is considerably reduced. This phenomenon is described in U.S. Pat. No. 3,243,481.

To improve the heat exchange in tube reactors with gentle stirring the reactors can contain extensive heat exchange means. A reactor of this type is described in U.S. Pat. No. 2,727,884. Such a reactor has the form of a slim tower or tank provided with heat exchange tubes in transverse position with respect to the longitudinal axis. Between the layers of heat exchange tubes stirrers are arranged which rotate slowly and improve the heat transport. With insufficient stirring, channeling of the material in the direction of flow of the material may occur so that portions rich in monomer come into temperature zones intended for a reaction mass with low monomer content which results in a broad molecular weight distribution and whereby the reaction may get out of control.

U.S. Pat. No. 3,243,481 describes a process for the manufacture of impact-resistant polystyrene in a reactor as described above. In this process a styrenic rubber solution containing an inert diluent and optionally a plasticizer is continuously reacted in a stirred vessel until a polymer content is reached which corresponds to twice the amount of rubber used. This prepolymer is continuously withdrawn from the reactor and transferred to tube reactors of the above type connected in series in which polymerization is continued to a polymer content of 80 to 95%. Finally, the resulting polymer is freed from volatile constituents in a working up stage.

DE-OS No. 1,770,392 discloses a similar process for the manufacture of styrene-containing polymers. In this process the prepolymerization up to a solids content of 35% is carried out in 2 stages, i.e. in two series-connected stirred vessels (two-stage stirred tank cascade). The polymerization is then completed in two series-connected stirred reactors. The space-time-yield obtained in this process amounts to about 82 kg of polymer per hour per cubic meter of reactor volume.

An analogous process described in DE-OS No. 2,539,605 gives space-time-yields of approximately 79 kg per hour per cubic meter of reactor volume.

The said space-time-yields are relatively low and, moreover, the reactors used are complicated due to the combination of stirrers and heat exchangers and, therefore, they are susceptible to failures.

It is the object of the present invention to provide a process for the manufacture of styrene-containing polymers which overcomes the aforedescribed disadvantages.

A process has been found for the continuous mass homo- and copolymerization of styrene which gives a high space-time-yield as well as products having favorable properties.

The present invention provides a process for the manufacture of alkenyl-aromatic homo- or copolymers by continuous mass polymerization, initiated thermally or by means of free radical initiators, of an alkenyl-aromatic compound or a mixture of alkenyl-aromatic compounds, optionally in the presence of a nitrile or an ester of acrylic or methacrylic acid and/or a natural or synthetic rubber, with a one-, two- or multi-stage continuous prepolymerization and subsequent one-, two- or multi-stage continuous main polymerization and final working up, which comprises subjecting the polymerizing mixture to a simultaneous treatment with heat exchange and static mixing effect in the stage(s) of the main polymerization.

Alkenyl-aromatic compounds that can be polymerized by the process of the invention are styrene, α-methylstyrene, styrenes carrying alkyl substituents in the benzene nucleus, for example o-, m-, and p-vinyl-toluene, the various isomeric vinyl-xylenes, o-, m-, and p-ethylvinylbenzene, styrenes halogenated in the benzene nucleus, such as o-, m- and p-chloro- or bromo-vinylbenzene, corresponding compounds with hydrogenated benzene nucleus, for example vinylcyclohexane, 1-methyl-2-vinylcyclohexane, 1-methyl-3-vinylcyclohexane, 1-methyl-4-vinylcyclohexane.

Alternatively, mixtures of the aforesaid compounds can be copolymerized or mixtures of the said compounds with a nitrile or an ester of an aliphatic alcohol having from 1 to 8 carbon atoms with acrylic acid or methacrylic acid.

It is also possible to graft-polymerize solutions of a natural or synthetic rubber such as polybutadiene, polyisoprene, butadiene-styrene rubber, ethylenepropylenediene (conjugated or non-conjugated) rubber in which the diene is, for example, hexadiene-1,4, dicyclopentadiene, 5-ethylidene-norbornene-2 or another 5-alkylidene-norbornene-2, in one of the aforesaid alkenyl-aromatic compounds or in a mixture of these compounds with one another or with one of the specified derivatives of (meth)arcrylic acid.

The polymerization of styrene or mixtures of styrene with α-methylstyrene, acrylonitrile and/or with one of the said rubbers is preferred.

The polymerization is initiated either thermally or by known initiators yielding free radicals upon decomposition, for example, azo compounds such as azodiisobutyronitrile, or peroxides such as benzoyl peroxide and its derivatives, or lauroyl peroxide.

The initiators are added preferably by dissolving in the monomer or monomer mixture.

Known regulators to adjust the molecular weight can also be added to the monomers, for example mercaptans or dimeric α-methylstyrene as well as the known plasticizers such as white oils or various esters of phthalic acid, and the usual antioxidants and UV stabilizers.

It is also possible to add to the monomers inert diluents such as aromatic hydrocarbons, for example ethylbenzene, toluene, xylenes or benzene.

The prepolymerization of the monomer or monomer mixture is carried out in one or more (series-connected) stirred vessels with continuous flow at a temperature of from about 373° to about 423° Kelvin, preferably about 388° to about 413° K. with thermal initiation and about 323° to about 373° K., preferably about 333° to about 353° K. with the use of free radical initiators.

A uniform flow of monomer or monomer mixture containing further additives as specified above is continuously fed to the (first) prepolymerization vessel.

With the use of more than 1 prepolymerization vessel a uniform flow of material is continually withdrawn from the first vessel and fed into the second one and so on.

A uniform flow of prepolymer is continually discharged from the (last) prepolymerization vessel and transferred to the main polymerization.

The stationary polymer content adjusting in the first stirred vessel, if only one is used, or in the second or last stirred vessel with the use of two or more vessels is suitably in the range of from 20 to 70% by weight, preferably 30 to 60% by weight in the absence of a rubber and preferably in the range of from 25 to 35% by weight in the presence of a rubber. When more than one prepolymerization vessels are used, the total conversion of the prepolymerization can be distributed as desired among the individual vessels.

As prepolymerization vessel commercial apparatus provided with jacket for temperature control and stirring means is used.

The main polymerization is carried out in one or two or more than two, horizontal or vertical, series-connected tube reactors containing a plurality of static mixing fitments with means for temperature control.

The reactor used for the main polymerization consist of a tubular housing provided with a jacket with means for temperature control, for example a double jacket through which a heat transfer medium flows, and internal fitments for treating the mixture flowing through the housing with a mixing and simultaneously heat exchanging effect. The fitments consist of tubes which extend in the axial direction of the housing and possess curved tube portions and other tube portions connecting the curved portions. The tubes are arranged parallel to one another, with the connecting tube portions of adjacent tubes crossing one another.

According to a preferred embodiment of the reactor to be used for the stage(s) of the main polymerization, the curved tube portions and the connecting tube portions extend in one plane and the planes formed in this manner are parallel to one another.

According to another preferred embodiment of the reactor, the curved tube portions of the tubes extend as far as the housing preferably having a circular cross section and the rectilinear connecting tube portions of adjacent tubes cross at right angles.

The tube fitments can consist of tube bundles connected in series which are turned relative to one another, preferably through 90°, about the axis of the housing.

It proved especially advantageous to provide the curved tube portions additionally with guide elements.

The reactor to be used according to the invention will now be described in further detail with reference to the accompanying drawing of which FIG. 1 shows a sectional view along I—I of FIG. 2 and FIG. 2 shows a frontral view of the reactor.

In the reactor housing 1, which can be provided with a double jacket 3 there are arranged tube fitments 2 extending in axial direction of the housing for the simultaneous mixing and heat exchanging treatment of the mixture flowing through the reactor. The tubes 2 comprise rectilinear tube portions 2a and curved tube portions 2b which for each tube are in one plane. The planes formed by the tubes lie parallel to one another. The connecting rectilinear tube portions 2a of adjacent tubes 2 cross (shown in the drawing as preferred embodiment) at an angle of about 90°; larger and smaller angles are also possible.

Each tube is provided with an inlet 7 and an outlet 10 for a heat exchange medium. For technical reasons it can be advantageous to connect the individual tubes 2 at their ends in order to have to pass a minimum number of inlets and outlets through the reactor wall. In the embodiment according to FIG. 2, the tubes of each half are grouped together and provided with inlets 7 and 9 and outlets 8 and 10.

With the use of a housing 1 with circular cross section spandrel-like spaces are formed in which internal fitments, for example guide plates 5, can be located.

In the example shown in the drawing, the rectilinear tube portions 2a of a tube 2 are parallel to one another and inclined at 45° to the axis of the housing. Other angles than 45° can also be chosen. Variants in which the rectilinear portions 2a of a tube 2 do not run parallel to one another are also feasible. In the reactor shown adjacent tubes 2 touch one another.

Mixing, the radial distribution and the uniformity of the residence time of the medium flowing through the reactor can be influenced in advantageous manner over the entire cross section of the reactor if guide elements 4 and 4a are located in the region of the curved tube portions 2b.

In FIG. 1, 6 denotes the direction of flow of the medium through the reactor and in FIGS. 1 and 2, 11 and 12 denote orifices in the double jacket for the introduction and withdrawal of a heat exchange medium.

The prepolymer discharged from the (last) prepolymerization vessel is introduced into the (first) reactor for the main polymerization as described above and flows through this and optionally further reactors.

The initial temperature of the polymerization mixture when entering the (first) reactor is preferably 393° to 423° K., more preferably about 413° K. With flow through the reactor(s) the temperature slowly rises to 443° to 493° K., preferably 443° to 463° K.

On issuing from the (last) reactor the mixture has a polymer content of 75 to 95% by weight, preferably 85 to 90% by weight.

The mixture obtained is subsequently worked up. Volatile organic constituents (unreacted monomer(s), inert diluents) are eliminated, for example, in a vent extruder or flash chamber. It is possible, for example, first to carry out a coarse degassing in a flash chamber with following fine degassing in a vent extruder. Finally, the product is granulated in usual manner.

The process according to the invention yields products having very valuable properties since with the static internal fitments a very narrow residence time spectrum can be obtained which, in combination with the heat exchange taking place at the same time makes possible an especially uniform and exact temperature control in the reaction mixture. In this manner products having a narrow molecular weight distribution are obtained in which the proportion of low molecular products is very low.

Instead of complicate and sensitive tube reactors having mobile elements (stirrer) according to the state of the art, improved reactors are used which have the further advantage that surprisingly space-time-yields of over 100 kg per hour per cubic meter are possible, corresponding to an increase of almost 30%. Hence, the process according to the invention is more economical.

The following example illustrates the invention.

EXAMPLE

The prepolymerization was carried out in a 250 liter stirred tank provided with helical stirrer and jacket heating. The feed was adjusted by means of a dosing device and another device made it possible to withdraw continuously a defined amount of prepolymer.

The continuous feed consisted of a mixture of 84.485% by weight of styrene, 9% by weight of a commercial polybutadiene rubber with about 50% of trans-, about 40% of cis- and about 10% of 1,2-vinyl configuration and having a Mooney viscosity $M_{L\ 1+4(100)}$ of about 35, 1.5% by weight of mineral oil, 5% by weight of ethylbenzene and 0.015% by weight of lauryl mercaptan. The constant throughput was 65 kg per hour. With a mean residence time in the prepolymerization vessel of 1.4 hours, an internal temperature of 408° K. and a number of rotations of the helical stirrer of 35 rpm, a stationary polymer content of 30% by weight was obtained. The prepolymer obtained was continually fed to the main polymerization in which it passed continuously three temperature zones.

As main polymerization reactor a reactor as described above and having a circular cross section was used. The reactor had a total length of 6 meters and an inner diameter of 30 cm. It contained as internal fitments 3 tube sections of a length of 2 meters each, which were turned relative to one another through 90° and the temperature of which could be controlled separately. Each tube section consisted of 5 layers of 38×3.6 mm tube. The tube layers were in touch with one another, the rectilinear tube portions 2a of adjacent tube layers crossed through an angle of 90° and the curved tube portions 2b touched the reactor wall. In the two spandrel-like space guide plates 5 were located. The free, total volume of the reactor was 360 liters (3 times 120 liters).

In the first tube section the temperature rose from the beginning to the end from 408° to 418° K., in the second tube section the temperature rose from 418° to 433° K. and in the third section it rose from 433° to 443° K.

The total residence time of the reaction mixture in the reactor was 5 hours, at the end of the third tube section the polymerization mixture had a polymer content of 89%.

The polymer discharged from the reactor was degassed in a commercial twin-shaft degassing extruder and granulated.

The final product obtained had the following properties:

| | |
|---|---|
| rubber content | 10.1% |
| content of soft phase | 32% |
| RSV | 0.83 dl/g |
| $M_w/M_n$ | 2.5 |
| melt index $MFI_{200/5}$ (DIN 53,735) | 3.6 |
| ball indentation hardness (DIN 53,456) | 76 kp/cm$^2$ |
| Vicat temperature (DIN 53,460) | 98° C. |
| notched impact strength at 0° C. (DIN 53,453) | 8.1 kpcm/cm$^2$ |
| elongation at break (DIN 53,455) | 82% |

The space-time-yield was 106 kg per hour per cubic meter of reaction volume.

The reduced specific viscosity (RSV) was measured at 25° C. with a solution of 1 g of styrene polymer in 100 ml of toluene.

What is claimed is:

1. Process for the manufacture of alkenyl-aromatic homo- or copolymers by continous mass polymerization, initiated thermally or by means of free radical initiators, of an alkenyl-aromatic compound or a mixture of alkenyl-aromatic compounds, or said aromatic compounds in the presence of a nitrile or an ester of acrylic or methacrylic acid and/or a natural or synthetic rubber, with a one-, two- or multi-stage continuous prepolymerization and subsequent one-, two- or multi-stage continuous main polymerization and final working up, which comprises subjecting in at least one stage during the main polymerization, the polymerizing mixture to a simultaneous treatment with heat exchange and static mixing, wherein the main polymerization is carried out in one or two or more series-connected horizontal or vertical tube reactors in which internal fitments are located, wherein the fitments consist of tubes which extend in the axial direction of the housing of the reactor extending from a wall of said reactor to an opposite wall of said reactor, said fitments possessing curved tube portions, and connecting tube portions extended in one plane said tubes being arranged substantially parallel to one another, in an array of planes with rectilinear tube portions of the adjacent tubes crossing one another at an angle of about 90 degrees and substantially next to each other, wherein the temperature of these fitments is controlled by a heat exchange medium flowing through said tubes.

2. The process of claim 1, wherein styrene is homo- or copolymerized.

3. The process of claim 1, wherein styrene is copolymerized with α-methylstyrene.

4. The process of claim 1, wherein the rubber is an ethylene-propylene-diene rubber.

5. The process of claim 1, wherein the rubber is an ethylene-propylene-5-ethylidene-norbornene-2-rubber.

* * * * *